United States Patent [19]
Lemieux

[11] Patent Number: 4,975,628
[45] Date of Patent: Dec. 4, 1990

[54] CLOSED-LOOP PWM CURRENT CONTROL FOR A VEHICLE TRANSMISSION FORCE MOTOR

[75] Inventor: Joseph J. Lemieux, Livonia, Mich.

[73] Assignee: General Motors Corporation, Detroit, Mich.

[21] Appl. No.: 478,899

[22] Filed: Feb. 12, 1990

[51] Int. Cl.$^5$ .............................................. G05B 11/28
[52] U.S. Cl. ...................... 318/599.000; 318/471.000; 361/161.000
[58] Field of Search ........................ 318/472, 471, 599; 180/339; 335/217, 220, 228, 290; 361/139, 140, 160, 161

[56] References Cited

U.S. PATENT DOCUMENTS 4,402,032  8/1983  Witterdink ...................... 335/290 X
4,838,037  6/1989  Wood .............................. 318/599 X

FOREIGN PATENT DOCUMENTS 60-241101 11/1985  Japan .................................... 318/599
61-105601  5/1986  Japan .................................... 318/599
63-228602  9/1988  Japan .................................... 361/160

Primary Examiner—Bentsu Ro
Attorney, Agent, or Firm—Mark A. Navarre

[57] ABSTRACT

A closed-loop PWM current control for force motor applications in which temperature induced impedance variations are compensated for without adversely affecting the transient response of the control. In generating the force motor PWM duty cycle, the control employs a digital integration of the sampled current error which, in addition to the usual pole, creates a zero which tracks and cancels the force motor pole. As a result, the undesired transient response characteristic associated with the interaction between the filter and force motor poles is avoided. The gain coefficients employed in the filter are chosen in relation to a measure of the force motor temperature so that the cancellation occurs throughout the range of expected temperature variation. Since the force motor is submersed in the transmission fluid, the temperature of the force motor is accurately represented by a measure of the fluid temperature.

3 Claims, 3 Drawing Sheets

| POINTER | TEMP (°C) | RES (Ω) | K1 | K2 |
|---|---|---|---|---|
| 0 | -40 TO -16 | 2.68-3.96 | 25.64 | 15.20 |
| 1 | -18 TO +8 | 2.98-4.39 | 23.45 | 13.00 |
| 2 | +6 TO +32 | 3.30-4.82 | 21.97 | 11.35 |
| 3 | +30 TO +56 | 3.63-5.25 | 21.24 | 10.25 |
| 4 | +54 TO +80 | 3.96-5.68 | 19.78 | 8.79 |
| 5 | +78 TO +104 | 4.29-6.11 | 19.04 | 7.69 |
| 6 | +102 TO +128 | 4.62-6.54 | 19.04 | 6.96 |
| 7 | +126 TO +152 | 4.94-6.97 | 19.04 | 6.23 |

CLOSED-LOOP PWM CURRENT CONTROL FOR A VEHICLE TRANSMISSION FORCE MOTOR

This invention relates to a method and apparatus for effecting closed-loop current control of a force motor used for vehicle transmission pressure control.

BACKGROUND OF THE INVENTION

Solenoid force motors, as used in fluid pressure control applications, are designed to supply pressure in direct proportion to the average current supplied to the solenoid coil. This means that a control system operating the force motor must schedule the supplied current as a function of the desired fluid pressure.

From a control system standpoint, the simplest approach is to maintain strict tolerances on the force motor impedance, and control the current in open-loop fashion. However, strict tolerancing of the force motor impedance is impractical in applications where the solenoid portion of the motor is subject to wide temperature excursions. The present disclosure is an example of such an application the force motor is employed for vehicle transmission pressure control, and is completely submersed in transmission fluid, which varies over the approximate range of $-40°$ C. to $+150°$ C. in normal operation. In such an application, impedance variations of up to 260% may be observed. In addition, source voltage variations may present a significant concern.

In applications such as the one described above, the conventional solution is to employ closed-loop control of the current—that is, measuring the average current actually supplied to the force motor, comparing it to the commanded current, and adjusting the current supply by an amount determined in relation to the difference, or error. In theory, the measured current will reflect the impedance of the force motor, and the current supply adjustment will compensate for any changes in the impedance. However, the measured current must reflect the average current, which generally requires substantial filtering of the measured (instantaneous) current, especially where the current is controlled by pulse-width-modulation (PWM) of the applied voltage. Unfortunately, the filtering, if sufficient to provide a measure of the average current, creates a pole which tends to interact with the pole of the force motor. This produces an underdamped transient response characteristic, as observed by overshooting of the commanded current.

SUMMARY OF THE INVENTION

The present invention is directed to an improved closed-loop PWM current control for force motor applications, wherein temperature induced impedance variations are compensated for without adversely affecting the transient response of the control. In generating the force motor PWM duty cycle, the control employs a digital integration of the sampled current error which, in addition to the usual pole, creates a zero which tracks and cancels the force motor pole. As a result, the undesired transient response characteristic associated with the interaction between the filter and force motor poles is avoided.

The temperature induced impedance variations shift the location of the force motor pole, and the gain coefficients employed in the filtering technique are chosen in relation to a measure of the force motor temperature so that the cancellation occurs throughout the range of expected temperature variation. Since the force motor is submersed in the transmission fluid, the temperature of the force motor is accurately represented by a measure of the fluid temperature.

DETAILED DESCRIPTION OF THE DRAWINGS

Figure 1A:
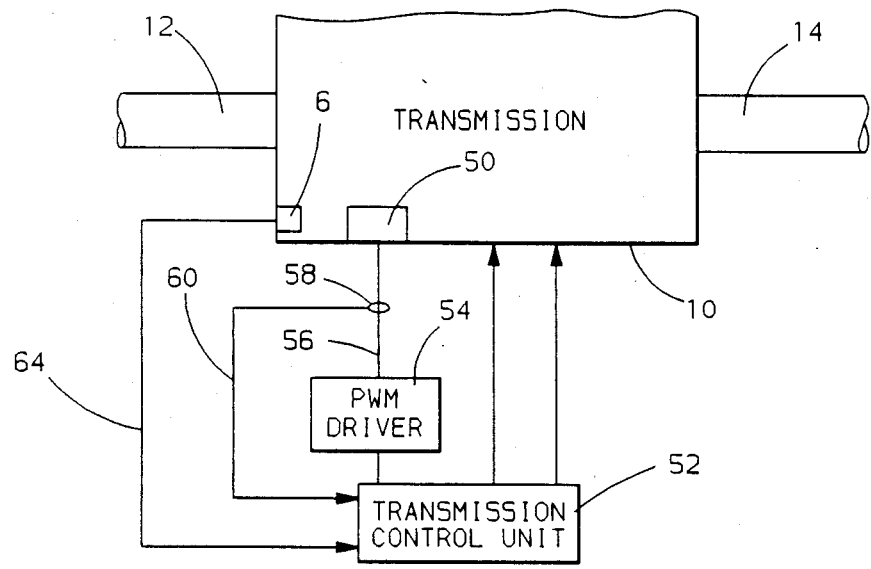
FIGS. 1b are schematic depictions of a vehicle transmission pressure control system including a force motor operated pressure control valve and a computer-based transmission control unit therefor.
Figure 1B:
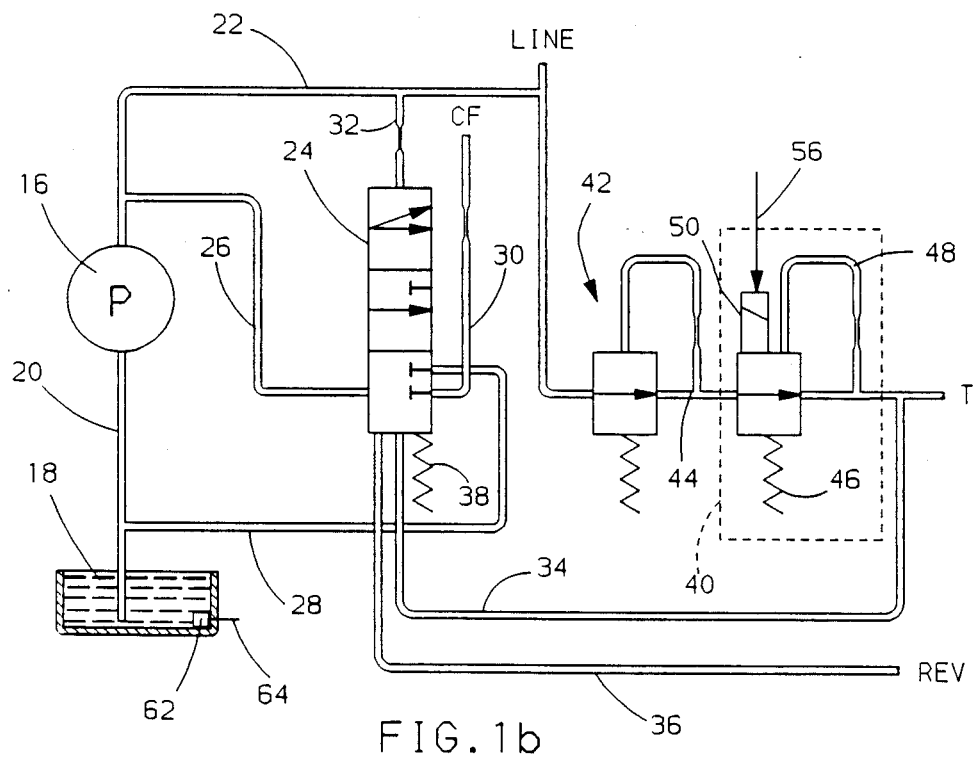

Referring particularly to FIGS. 1a–1b, the reference numeral 10 designates a motor vehicle automatic transmission including fluid operated torque establishing devices (not shown) for defining one or more speed and torque ratios between input shaft 12 and output shaft 14. The input shaft 12 is typically driven by an operator controlled engine, the output shaft 14 being drivingly coupled to one or more vehicle wheels.

Fluid pressure for operating the transmission torque establishing devices, referred to herein as line pressure (LINE), is developed by a pump 16 driven by the input shaft 12. The pump 16 draws fluid from a reservoir 18 through fluid line 20, developing line pressure in fluid line 22.

A conventional pressure regulator 24 is connected between the fluid line 22 and the reservoir 18 via lines 26 and 28 for the purpose of regulating the line pressure and developing a second regulated pressure in line 30, generally referred to as converter feed (CF) pressure. Influencing the operation of the regulator 24 is the line pressure (orificed through line 32), an input torque-related pressure (T) in line 34, Reverse range pressure (REV) in line 36 and a bias spring 38. The line pressure signal in line 32 is opposed by the sum of the bias spring 38, the input torque-related pressure in line 34 and the Reverse range pressure in line 36.

As indicated by the blocks and arrows within the regulator 24, three modes of regulation are possible. For given input torque and Reverse range pressures, the lowermost block will be in effect when the line pressure is relatively low. In this case, line pressure is supplied by the full output of pump 16, and no converter feed pressure is developed. At somewhat higher values of line pressure, the middle block applies, and a portion of the output of pump 16 is used to develop converter feed pressure in line 30. At even higher values of line pressure, the third block applies. In this case, the output of pump 16 is more than sufficient to develop the desired levels of line pressure and converter feed pressure, and a portion of the pump output is returned to the reservoir 18 via line 28.

In practice, the input torque-related and Reverse range pressures in lines 34 and 36 are employed to control the line and converter feed pressures. In the Reverse range operation, for example, the Reverse range pressure in line 36 will cause the line and converter feed pressures to be higher than for similar input torque operation in a Forward range. Similarly, the input torque-related pressure in line 34 causes the line and converter feed pressures to vary in direct relation to the magnitude of the torque supplied to the transmission input shaft 12 by the vehicle engine.

The input torque-related pressure in line 34 is obtained from a force motor operated pressure control valve, generally designated by the reference numeral 40. A simple spring biased regulator valve, generally designated by the reference numeral 42, supplies a regulated pressure in line 44 as an input to force motor valve 40. The force motor valve 40 is influenced by a bias spring 46, the input torque-related output pressure (orificed through line 48), and the output force of an electromagnetic force motor 50. The force motor may be a conventional device (available from Robert Bosch, GMbH of Stuttgart, Federal Republic of Germany, among others), capable of developing mechanical output force in relation to the average DC current supplied thereto. In the illustrated embodiment, a computer-based transmission control unit 52 directs a PWM driver circuit 54 to supply current to the force motor 50 via line 56. The bias spring 46 is opposed by the sum of the force motor pressure and a force corresponding to the orificed input torque-related pressure in line 48. In operation, then, the torque signal pressure output in line 34 varies in relation to the magnitude of the current supplied to force motor 50 via line 56.

A closed-loop control of the current supplied to the force motor 50 via line 56 is carried out by the computer-based transmission control unit 52. To this end, a current sensor or shunt 58 is located in the line 56 to provide a signal on line 60 corresponding to the instantaneous level of current therein. In addition, and as explained above, a temperature sensor 62 submersed in the transmission fluid reservoir 18 provides an input signal to the control unit 52 on line 64 corresponding to the transmission fluid temperature.

Figures 2, 3:
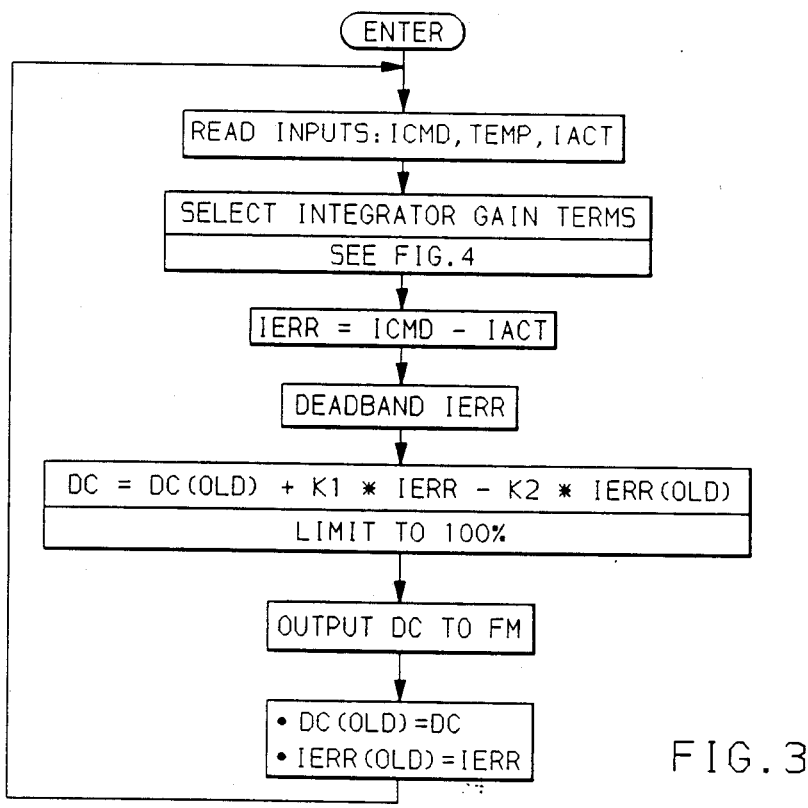
FIG. 2 a table depicting the scheduled relationship between the transmission fluid temperature and the digital filter grain coefficients.
FIGS. 3–4 are flow diagrams representative of computer program instructions executed by the transmission control unit of FIG. 1 in carrying out the control of this invention.

Referring to the flow diagram of FIG. 3, it will be seen that the control unit 52 executes a series of instructions for sequentially: (1) reading the current command and transmission fluid temperature terms ICMD and TEMP; (2) selecting the filter gain terms K1 and K2 based on TEMP; (3) developing a current error signal IERR according to the difference between a current command ICMD and a measured sample of the force motor current IACT in line 60; (4) computing an integral modifier for the old duty cycle DC(OLD) based on the new and past (OLD) current error values IERR, IERR(OLD); outputting the new duty cycle DC to PWM driver 54; and (6) updating old duty cycle and current error terms DC(OLD) and IERR(OLD) with the new values DC and IERR.

As indicated above, the current error term is computed according to the expression:

IERR = ICMD − IACT where ICMD is a current command determined in relation to the desired output force of force motor 50. In the illustrated embodiment, the control unit 52 develops a signal corresponding to the input torque applied by the engine to input shaft 12, and schedules the current command ICMD in relation thereto. Error values within a zero deadband are ignored, as indicated. Current error values within a zero-referenced deadband are ignored as indicated.

The new PWM duty cycle DC is determined according to the expression:

%DC = %DC(OLD) + K1*IERR − K2*IERR(OLD) where %DC(OLD) AND IERR(OLD) represent the duty cycle and current error values determined in the previous loop. This will be recognized as a first-order filter having integrator gain coefficients K1 and K2. The coefficients K1 and K2 determine the location of the filter pole and zero, and are selected according to this invention as a function of the measured temperature of the transmission fluid in reservoir 18.

In the illustrated embodiment, the integrator gain selection is carried out by dividing the range of expected temperature variation (−40° C. to +150° C.) into eight slightly overlapping regions, as indicated in the table of FIG. 2. The impedance variation of the force motor 50 is specified for a single temperature such as +20° C. From the high and low impedance value at that temperature, the impedance variation is estimated for the entire range of expected temperatures, according to the expression:

Rest = [1 − (20 − T) * Kcu] * Rnom where Rest is the estimated impedance at temperature T, Rnom is the nominal force motor impedance at 20° C., and Kcu is the thermal coefficient of the copper windings of force motor 50. For each of the eight regions, the filter coefficient values K1 and K2 are determined so that the filter zero tracks (and thereby cancels) the force motor pole, while maintaining adequate averaging of the measured current IACT. Representative values of K1 and K2 for a Bosch force motor having a nominal impedance of 4.0 ohms at 20° C. are given in the table.

Figure 4:
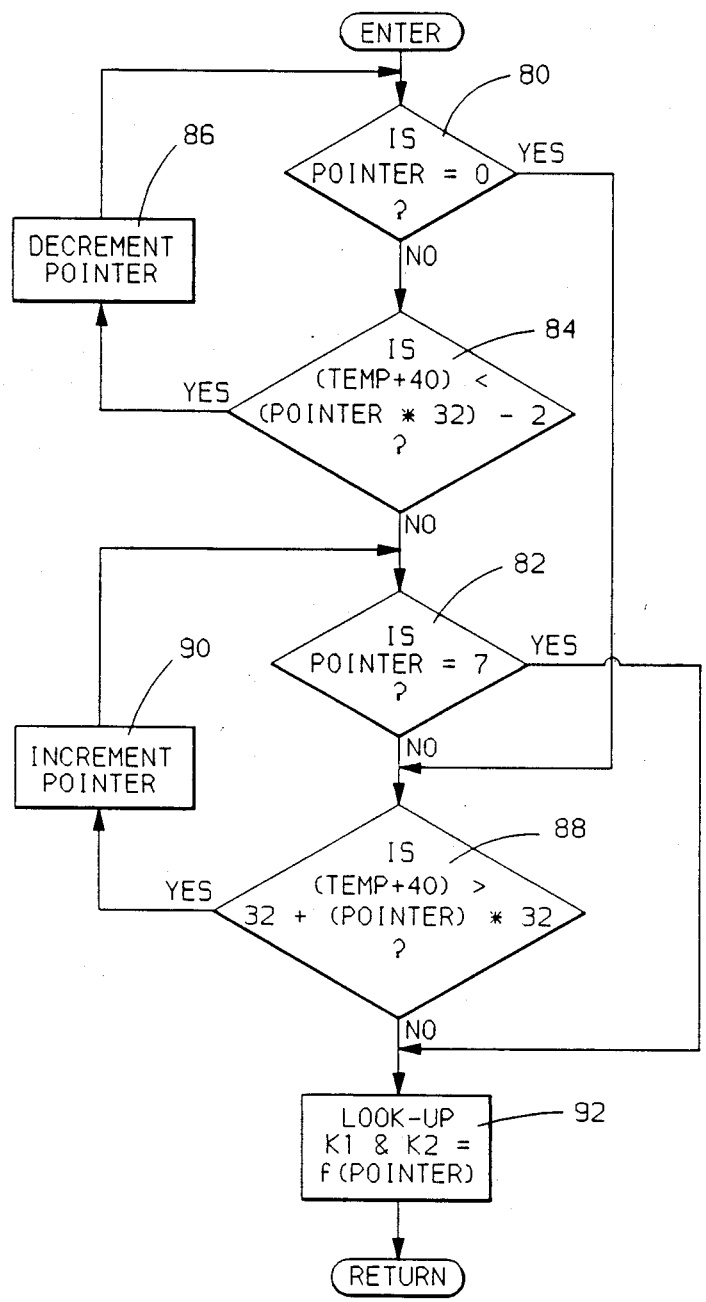

To implement a control utilizing the table information of FIG. 2, the flow diagram of FIG. 4 defines a term referred to as POINTER. As indicated in FIG. 2, the term POINTER has a value of 0 for the first temperature region, 1 for the second region, and so on. As indicated in FIG. 3, the FIG. 4 flow diagram is executed in each program loop after the fluid temperature is determined to select the filter gain terms K1 and K2.

The routine diagrammed in FIG. 4 is an iterative technique for determining an appropriate value for the term POINTER, based on the measured temperature TEMP. So long as POINTER is greater than zero but less than seven, as determined by blocks 80–82, the blocks 84–90 are executed to decrement or increment POINTER as required. If POINTER is zero, decrementing is not allowed. Block 84 determines whether the measured temperature TEMP (plus an offset of 40) is lower than the lower limit of the current pointer setting; block 88 determines whether the measured temperature TEMP (plus an offset of 40) is higher than the upper limit of the current pointer setting. Once the blocks 84 and 88 have been answered in the negative or POINTER has been incremented to seven, the block 92 is executed to look-up the stored values of K1 and K2 corresponding to the value of POINTER.

While this invention has been described in reference to the illustrated embodiment, it is expected that various modifications will occur to those skilled in the art. In this regard, it will be understood that systems incorporating such modifications may fall within the scope of this invention, which is defined by the appended claims.

The embodiments of the invention in which an exclusive property or privilege is claimed are defined as follows:

1. In a control for pulse-width-modulating (PWM) the voltage applied to a solenoid operated device at a variable duty cycle for supplying a regulated current thereto, the solenoid operated device being designed to develop an output in relation to the average value of the supplied current and having an impedance-related pole which shifts as a function of the temperature of the device, a method of operation comprising the steps of:

periodically sampling the current supplied to the solenoid operated device and determining a current error term in relation to the difference between the sampled current value and a current command corresponding to a desired output of said device;

adjusting the PWM duty cycle as an integral filter function of present and past values of said current error term, using integrator gain terms which define a filter-related pole displaced from the impedance-related pole and a zero located in proximity to said impedance-related pole for canceling said impedance-related pole, thereby to avoid undesired interaction between said filter-related pole and said impedance-related pole; and adjusting said gain terms in relation to the temperature of said device such that the zero defined by said gain terms tracks the impedance-related pole, thereby to compensate for temperature induced shifting of said impedance-related pole.

2. The method of operation set forth in claim 1, wherein the solenoid operated device is submersed in fluid and the gain terms are determined in relation to the temperature of the fluid.

3. In a control for pulse-width-modulating the voltage applied to a solenoid operated device at a variable duty cycle for supplying a regulated current thereto, the solenoid operated device being designed to develop an output in relation to the average value of the supplied current and having an impedance-related pole which shifts as a function of the temperature of the device, a method of operation comprising the steps of:

periodically sampling the current supplied to the solenoid operated device and determining a current error term IERR in relation to the difference between the sampled current value and a current command corresponding to a desired output of said device;

pulse-width-modulating the applied voltage at a duty cycle DC determined according to the expression:

$$DC = DC(OLD) + K1*IERR - K2*IERR(OLD)$$

where DC(OLD) is a prior value of the pulse-width-modulation duty cycle DC, IERR(OLD) is a prior value of the current error term IERR, and K1 and K2 are integrator gain terms, thereby defining an integrator pole displaced from the impedance-related pole and an integrator zero located in proximity to said impedance-related pole for canceling said impedance-related pole, thereby to avoid undesired interaction between said integrator pole and said impedance-related pole, the gain terms being chosen as a function of the temperature of the solenoid operated device so that said integrator zero tracks the impedance-related pole, thereby to compensate for temperature induced shifting of said impedance-related pole.

* * * * *